(12) United States Patent
Onishi

(10) Patent No.: US 8,109,594 B2
(45) Date of Patent: Feb. 7, 2012

(54) UNIT FOR MEASURING COLOR AND RECORDING APPARATUS

(75) Inventor: Wataru Onishi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 971 days.

(21) Appl. No.: 12/101,747

(22) Filed: Apr. 11, 2008

(65) Prior Publication Data

US 2008/0252948 A1      Oct. 16, 2008

(30) Foreign Application Priority Data

Apr. 13, 2007   (JP) ................................. 2007-105979
Feb. 5, 2008    (JP) ................................. 2008-025415

(51) Int. Cl.
*B41J 29/393*      (2006.01)
(52) U.S. Cl. .......................................... 347/19; 347/105
(58) Field of Classification Search .................... 347/19;
250/226; 356/402, 319, 320
See application file for complete search history.

(56) References Cited

FOREIGN PATENT DOCUMENTS

| JP | 11-004353 | 1/1999 |
|---|---|---|
| JP | 11-326056 | 11/1999 |
| JP | 2000-241248 | 9/2000 |
| JP | 2001-264173 | 9/2001 |
| JP | 2001-324387 | * 11/2001 |
| JP | 2003-091080 | 3/2003 |
| JP | 2003-229996 | 8/2003 |
| JP | 2005-338110 | 12/2005 |
| JP | 2006-227012 | 8/2006 |
| JP | 2006-234471 | 9/2006 |
| JP | 2007-256104 | 10/2007 |

* cited by examiner

*Primary Examiner* — Julian Huffman
(74) *Attorney, Agent, or Firm* — Workman Nydegger

(57) ABSTRACT

A color measuring unit that is easily mounted in a recording apparatus and measures with high accuracy. All of the elements of the color measuring are integrated into a single unit, such that the color measuring can be used independently in a separated form.

The color measuring unit is equipped with a calorimeter holder holding a calorimeter. A carriage reciprocating means is connected to the calorimeter holder and has a calorimeter carriage for reciprocally moving the calorimeter holder in a column direction formed by a color measuring pattern. A pressing member in a pressing posture presses the surface of a recording member on which the color measuring pattern is recorded when measuring color. In a retreated posture, the pressing member retreats so that the recording member can be transported. A rotating and shifting means switches the pressing posture and the retreated posture of the pressing member.

18 Claims, 15 Drawing Sheets

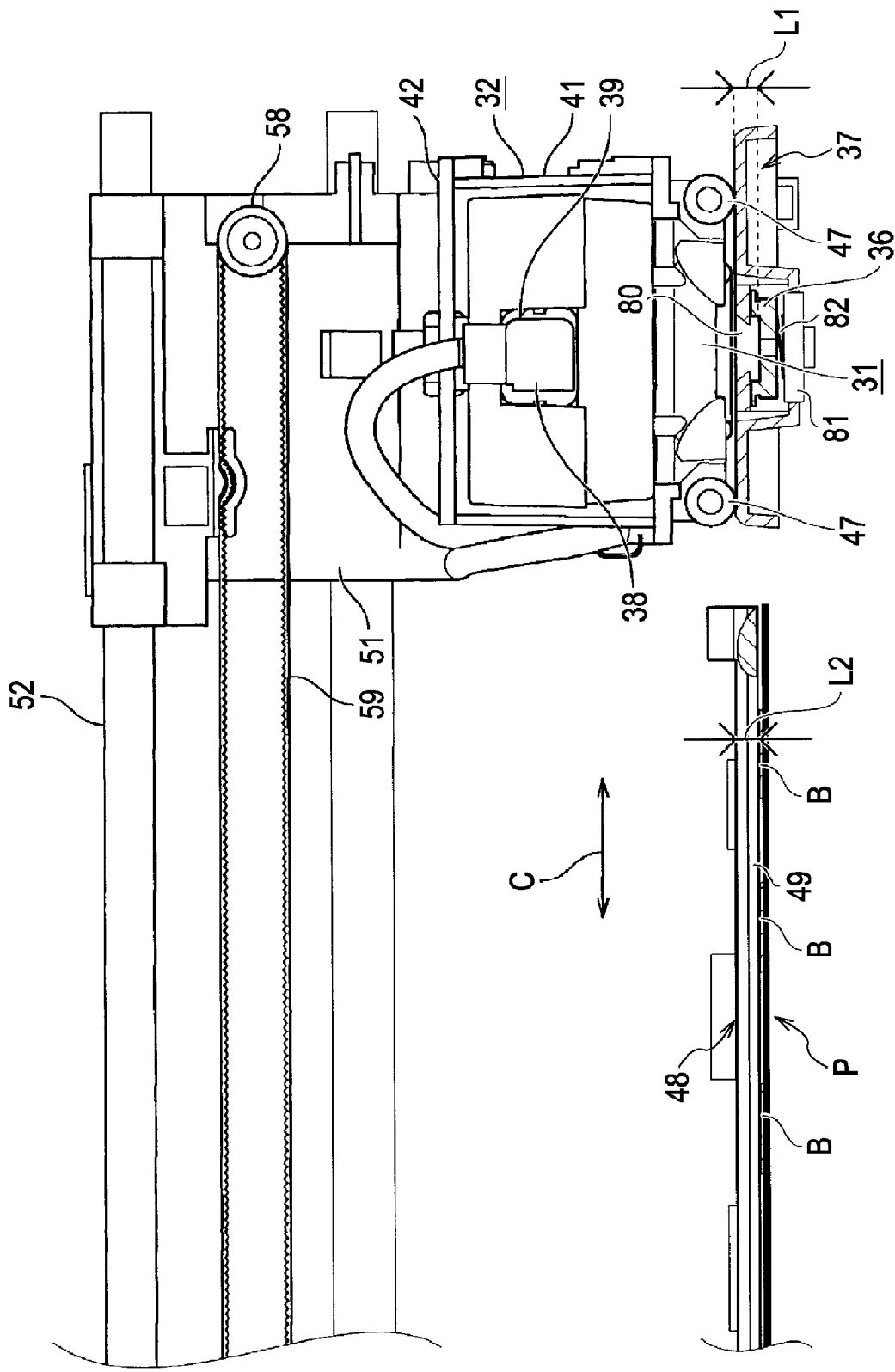

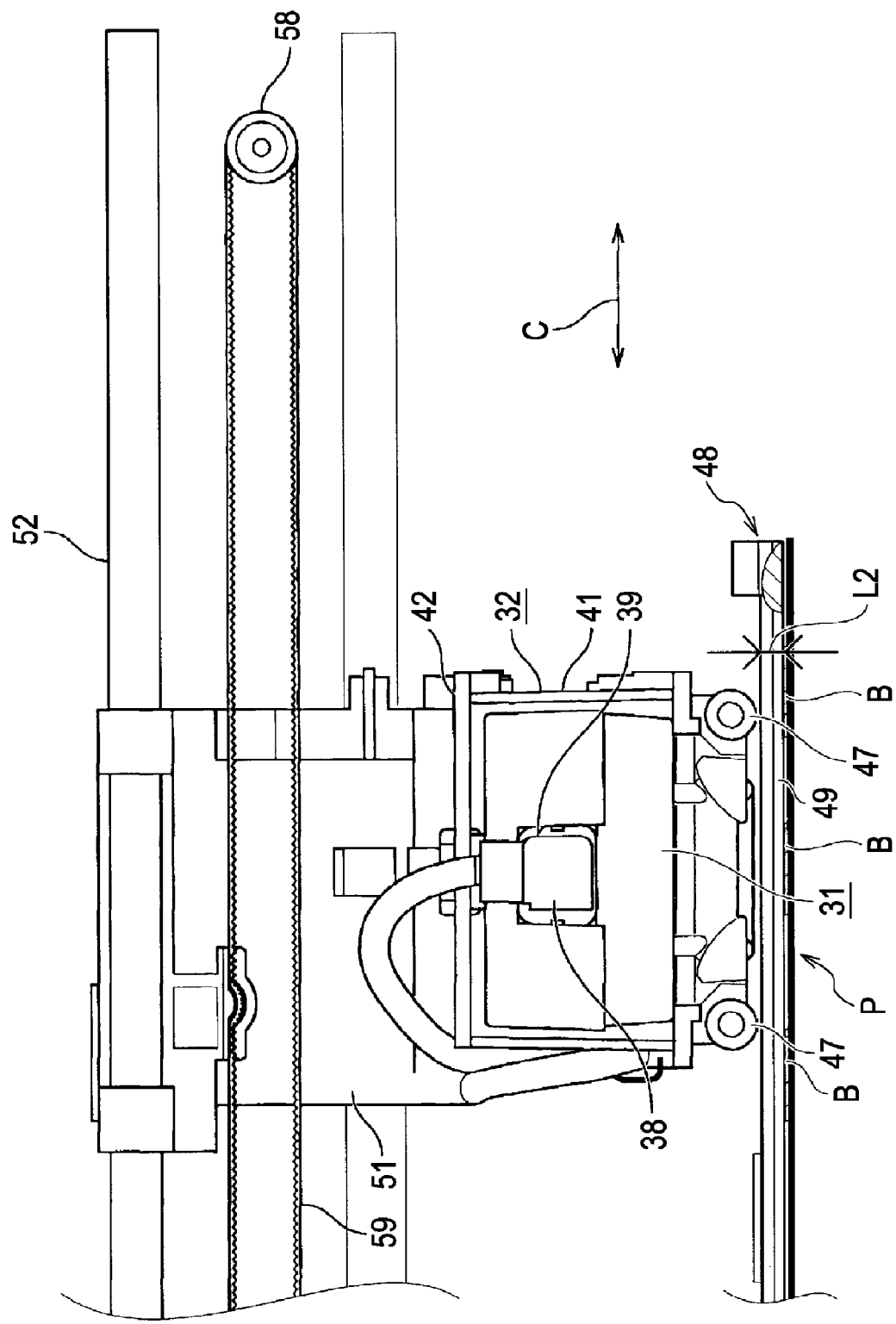

UNIT FOR MEASURING COLOR AND RECORDING APPARATUS

BACKGROUND OF THE INVENTION

1. Field of the Invention

The present invention relates to a color measuring unit which measures color of a color measuring pattern recorded on a colorable medium which can be colored by a coloring mechanism.

2. Description of the Related Art

In printed matter production sites, a proof has been generally performed before printing. Further, color correction, which checks whether colors of image data is faithfully expressed, has been performed using images formed in a sample copy, which underwent proof processing, and authentication color patches displayed along with the images as a reference for correction.

On the other hand, a digital matching method, in which colors of an image displayed on a cathode ray tube (CRT) monitor and colors of an image expressed on a print sample copy outputted from an output device, such as a printer or an image setter are electrically matched using a color management file called profile, has been used in wide and performed at printed matter production sites or print data production sites (Patent Document 1).

Recently, color correction called simple proof printing in which a proof sheet is directly generated from printmaking print data is used in wide in order to decrease the time for proof processing, and a large-sized ink-jet printer is used for producing such a proof sheet. In the case of producing the proof sheet using the large-sized ink-jet printer, color information of an authentication color patch and a profile production color patch is measured using a color measuring apparatus called colorimeter, correction values are obtained by comparing the measured color information with colors of print data on the CRT monitor on the basis of the measurement result, and the color correction information is supplied to a printer driver which is a recording control device of an ink-jet printer.

The following patent document 2 discloses a color proofer in which a calorimeter can be attached to a carriage in which a recording head of the ink-jet printer is mounted and a calibrating method using the color proofer. However, in such a color proofer, since the calorimeter is attached to a recording head scanning carriage, the calorimeter cannot perform scanning alone in the separated from the recording head. Moreover, when reading the color information from the color patches, the read result of the color information varies according to even fine protrusion on the recording surface of the recording member on which the color patches are recorded. Accordingly, a method of securely holding the recording member by fixing the recording member is prefer to a method of measuring color while rotating the recording member like the color proofer disclosed in the patent document 2.

Patent document 1: JP-A-H11-004353
Patent document 2: JP-A-H11-326056

SUMMARY OF THE INVENTION

The invention is conceived under such background techniques and an object of the invention is to provide a color measuring unit which has improved easiness in use because it can operate independently, can be easily mounted in a recording apparatus, and measures color with high accuracy, and a recording apparatus equipped with the color measuring unit.

Another object of the invention is to provide a color measuring unit which can press a recording member without causing any damage to the recording member on which a color measuring pattern, such as a color patch, is recorded when measuring color, can allow a calorimeter to smoothly move, does not hinder transportation of the recording member when not measuring color, and a recording apparatus equipped with the color measuring unit.

In order to solve the above-mentioned problems, a color measuring unit according to a first aspect of the invention includes a calorimeter holder holding a colorimeter, a carriage reciprocating means equipped with a calorimeter carriage which is connected with the calorimeter holder and makes the calorimeter reciprocally move in a column direction of a color measuring pattern, a pressing member which is in a pressing posture in which the pressing member presses the surface of a recording member on which the color measuring pattern is recorded when measuring color and is in a retreated posture in which the pressing member retreats from a position of the pressing posture and thus allows the recording member to be transported, and a rotating and shifting means which switches the pressing member between the pressing posture and the retreated posture, all the elements being integrally formed.

According to the first aspect of the invention, since the colorimeter, the calorimeter holder, the carriage reciprocating means, the pressing member, and the rotating and shifting means which constitute a color measuring apparatus are integrated into a single unit, it is possible to measure color by using the color measuring unit in a separated form, it is possible to mount the color measuring unit in a recording apparatus, and it is possible to measure color with high accuracy.

A color measuring unit according to a second aspect of the invention is characterized in the color measuring unit according to the first aspect of the invention such that it is further equipped with a calibration means performing calibration of the calorimeter when not measuring color.

According to this aspect, since the calibration means is also integrated into the color measuring unit, the advantageous effect of the first aspect can be more effectively achieved.

A color measuring unit according to a third aspect of the invention is characterized in the color measuring unit according to the second aspect of the invention such that a tile holder holding a white tile serving as the calibration means is disposed at a home position of the calorimeter carriage, i.e. at a side of a transportation path along which the recording member on which the color measuring pattern is recorded passes, and the calorimeter covers the upper surface of the white tile when not measuring color, i.e. when the calorimeter carriage is located at the home position.

According to this aspect, when not measuring color, the calorimeter covers the upper surface of the white tile by itself and thus it is possible to prevent dirt from sticking to the upper surface of the white tile. On the other hand, when measuring color, the calorimeter is automatically separated from the upper surface of the white tile, and the color measuring operation is automatically performed. Accordingly, a cover detachment operation which is bothersome work is not needed.

A color measuring unit according to a fourth aspect of the invention is characterized in the color measuring unit according to the third aspect such that distance between the upper surface of the white tile and the upper surface of the tile holder is equal to distance between the surface of the recording member and the surface of the pressing member.

Here, the word "equal" of the distances does not means "precisely equal" while considering the error of the accuracy of the members but means "equal" while not considering the error of the accuracy of the members. That is, the distances may be equal to each in a range by which the following object can be accomplished.

If the distance from the calorimeter to the surface of the recording member on which the color measuring pattern is recorded varies, the value obtained by the calorimeter is likely to fluctuate.

Accordingly, the distance between the calorimeter and the surface of the recording member, on which the color measuring pattern is recorded, and the distance between the calorimeter and the surface of the white tile are different from each other by a great deal, variation condition when measuring color and variation condition when performing calibration become greatly different from each other.

Accordingly, according to this aspect, the distance between the surface of the white tile and the surface of the tile holder, and the distance between the surface of the recording member and the surface of the pressing member are equal to each other. Accordingly, it is possible to harmonize the variation condition when measuring color with the variation condition when performing calibration. As a result, it is possible to decrease the error of the values obtained by the calorimeter when measuring color.

In greater detail, when measuring color and when performing calibration, the distance (error) from the calorimeter to the calorimeter holder is under the same condition. At this time, only the error between the pressing member and the tile holder may be considered.

For example, in the case in which the pressing member and the tile holder slightly deform due to heat, etc., it is possible to lengthen the distance from the surface of the white tile to the surface of the tile holder and the distance from the surface of the recording member to the surface of the pressing member such that the distances become equal to each other. That is, it is possible to offset the error (fluctuation) of the values obtained by the calorimeter by adjusting conditions in a manner such that the variations are the same each other. As a result, the error of the values obtained by the calorimeter when measuring color decreases.

A color measuring unit according to a fifth aspect of the invention is characterized in the color measuring unit according to the third aspect of the invention such that a thickness of the tile holder which is a way from the surface of the white tile to a position where the tile holder contacts the calorimeter holder, is equal to a thickness of the pressing member which is a way from the surface of the recording member to a position where the pressing member contacts the calorimeter holder.

According to this aspect, the advantageous effect of the fourth aspect of the invention can be accomplished.

A color measuring unit according to a sixth aspect of the invention is characterized in the color measuring unit according to one of the first to fifth aspects of the invention such that a driving cartwheel, which is rolling while being in contact with the surface of the pressing member which is in the pressing posture, is disposed on the surface of the calorimeter holder which faces the color measuring pattern when the measuring color of the calorimeter holder. Accordingly, the measurement accuracy of the calorimeter improves since the movement of the calorimeter becomes smoother thanks to the driving cartwheel.

A color measuring unit according to a seventh aspect of the invention is characterized in the color measuring unit according any of the first to sixth aspect of the invention such that a long hole which allows light emitted from the calorimeter to reach the color measuring pattern is provided in the pressing member in a manner such that it extends in a column direction of the color measuring pattern, and a pressing surface of the pressing member is provided with pressing protrusions which contact only a portion of the surface of the recording member around the color measuring pattern.

According to this aspect, the pressing member enables the calorimeter to perform color measurement and the recording member is kept being pressed and fixed thanks to the contact of the pressing protrusions formed on the lower surface of the pressing member at only a limited portion of the surface of the recording member, the portion not affecting the color measuring pattern. Accordingly, damage is not caused to the color measuring pattern.

A color measuring unit according to an eighth aspect of the invention is characterized in the color measuring unit according to the seventh aspect such that the pressing protrusions are disposed at positions where a plurality of color measuring patterns arranged in a column direction thereof and spaced from each other does not contact columns of the color measuring patterns which are used for profile generation and arranged in multiple stages in a transportation direction of the recording member.

According to this aspect, the color measuring unit can be applied to the color measuring pattern, such as a profile production color patch used for profile generation, in which a plurality of columns thereof is arranged while being spaced from each other, as well as the color measuring pattern, such as an authentication color patch.

A color measuring unit according to a ninth aspect of the invention is characterized in the color measuring unit according to any of the first to eighth aspects of the invention such that the pressing member is equipped with a rotating lever which rotates about a rotating shaft, and a pressing plate which is in contact with a free end of the rotating lever in a freely rotating manner and abuts on the surface of the recording member, and a pressing plate pushing spring, which supports a leading end portion of the pressing plate on the bias so that the pressing plate does not move in a direction opposite to a direction in which pressure is applied, is disposed between the rotating lever and the pressing plate.

According to this aspect, when the leading end of the pressing plate abuts on the surface of the recording member, force is applied in a direction that a pressing plate pushing spring expands. Accordingly, the pressing plate pushing spring elastically deforms in an expanding direction thereof and thus the pressing plate is rotated. As a result, the pressing plate comes to be in close contact with the surface of the recording member. At this time, reactive force that the pressing plate pushing spring would recover to its original form acts on the pressing plate. Accordingly, the surface of the recording member comes to be securely held thanks to the strong pressing force.

A recording apparatus according to a tenth aspect of the invention includes a recording member transporting portion, a record performing portion which performs recording on a recording member transported by the recording member transporting portion, and a color measuring portion which measures color of a color measuring pattern recorded in the record performing portion. The color measuring portion is constituted from the color measuring unit according to any of the first to ninth aspects of the invention.

According to this aspect, since the color measuring unit is provided in the recording apparatus, the recording apparatus has a function of a color measuring apparatus, is not limited in the operation and structure thereof, and has the value-added use by employing both functions. For example, since the color correction is performed on the basis of the color measuring pattern which is recorded by the recording apparatus, the error between the apparatuses is decreased in comparison with the case in which the color correction is performed on the basis of the color measuring pattern outputted from another recording apparatus and an outputting apparatus, accuracy of the color correction improves.

BRIEF DESCRIPTION OF THE DRAWINGS

FIG. 15 is a front sectional view illustrating the surrounding area of a tile holder in an enlarging manner (when not measuring color).

FIG. 16 is a front sectional view illustrating the surrounding area of the tile holder in an enlarging manner (when measuring color).

DESCRIPTION OF THE PREFERRED EMBODIMENTS

Hereinafter, a color measuring unit and a recording apparatus equipped with the color measuring unit according to the invention will be described. First, as the best embodiment for implementing a recording apparatus according to the invention, an ink-jet printer 100 is picked and the overall structure thereof will be described with reference to the accompanying drawings. In addition, the ink-jet printer 100 described herein is a large scale ink-jet printer which can perform recording on a large-size recording member P (hereinafter, referred to as cut paper P) in the sheet form, for example which has A3 plus size or larger, or a large size recording member R (referred to as roll paper R) in the roll form, which has A1 plus size or B0 plus size.

Figure 1:
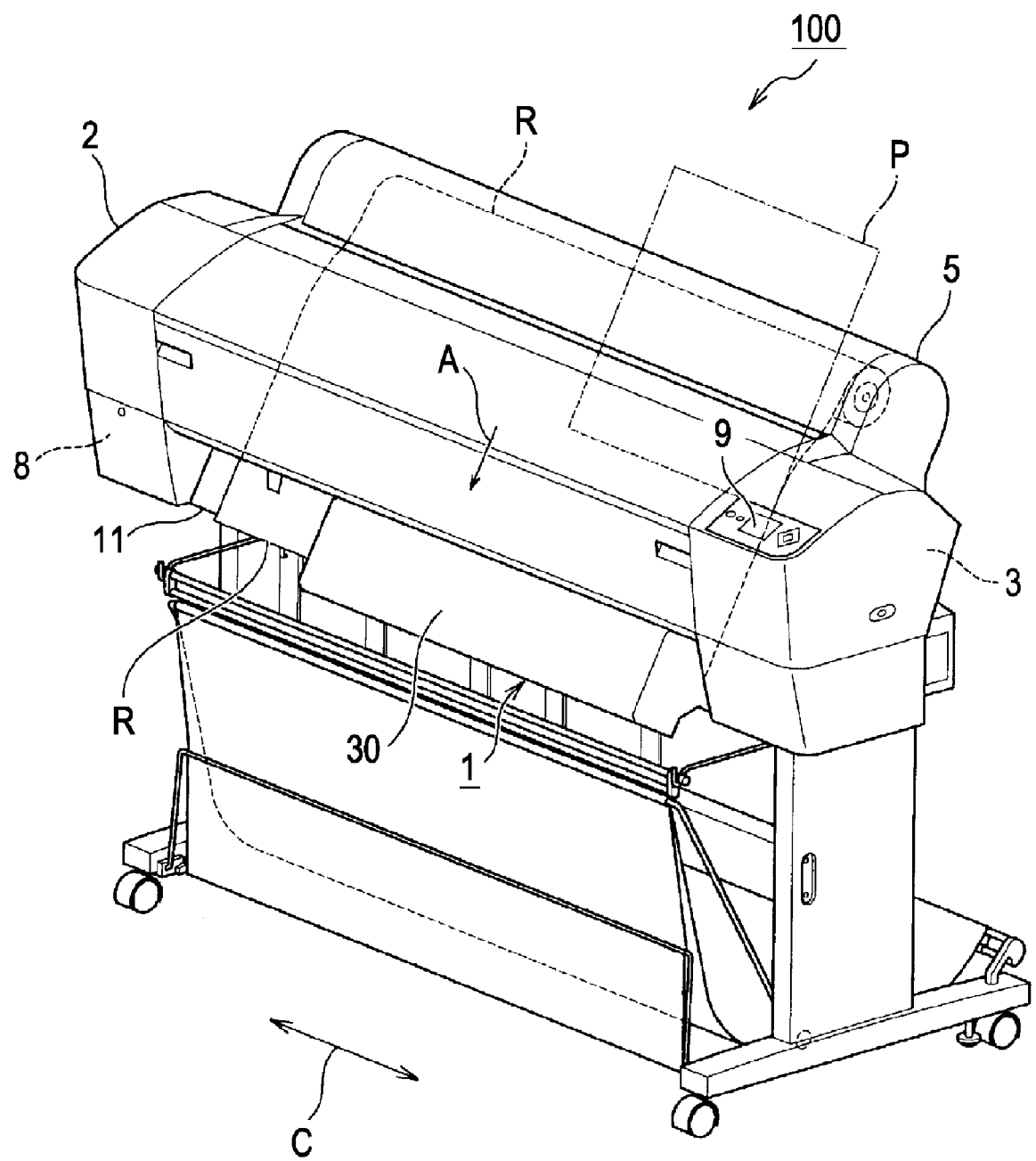
FIG. 1 is a perspective view illustrating appearance of an ink-jet printer when attaching a body cover.
Figure 2:
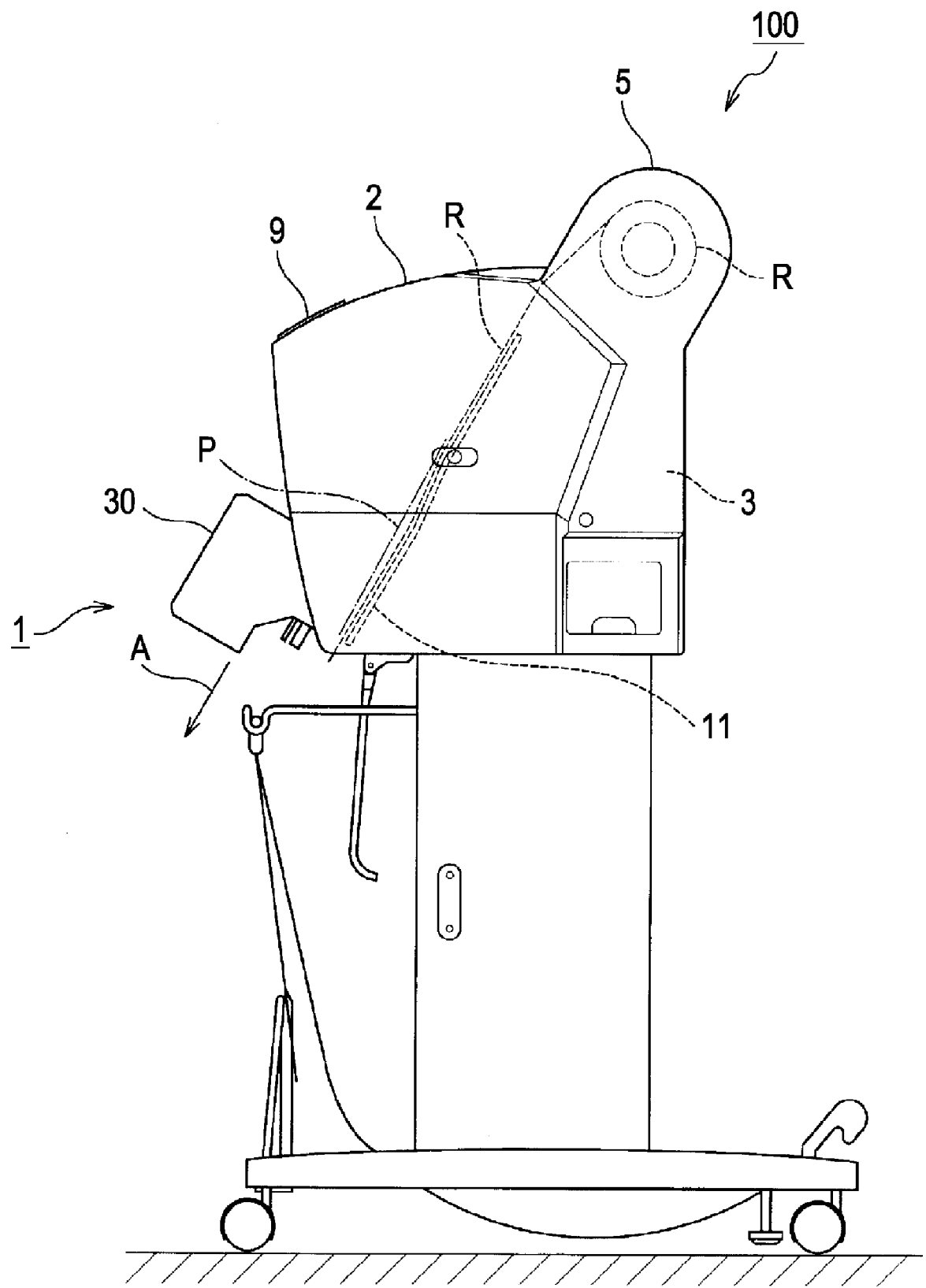
FIG. 2 is a side view illustrating appearance of an ink-jet printer when attaching a body cover.
Figure 3:
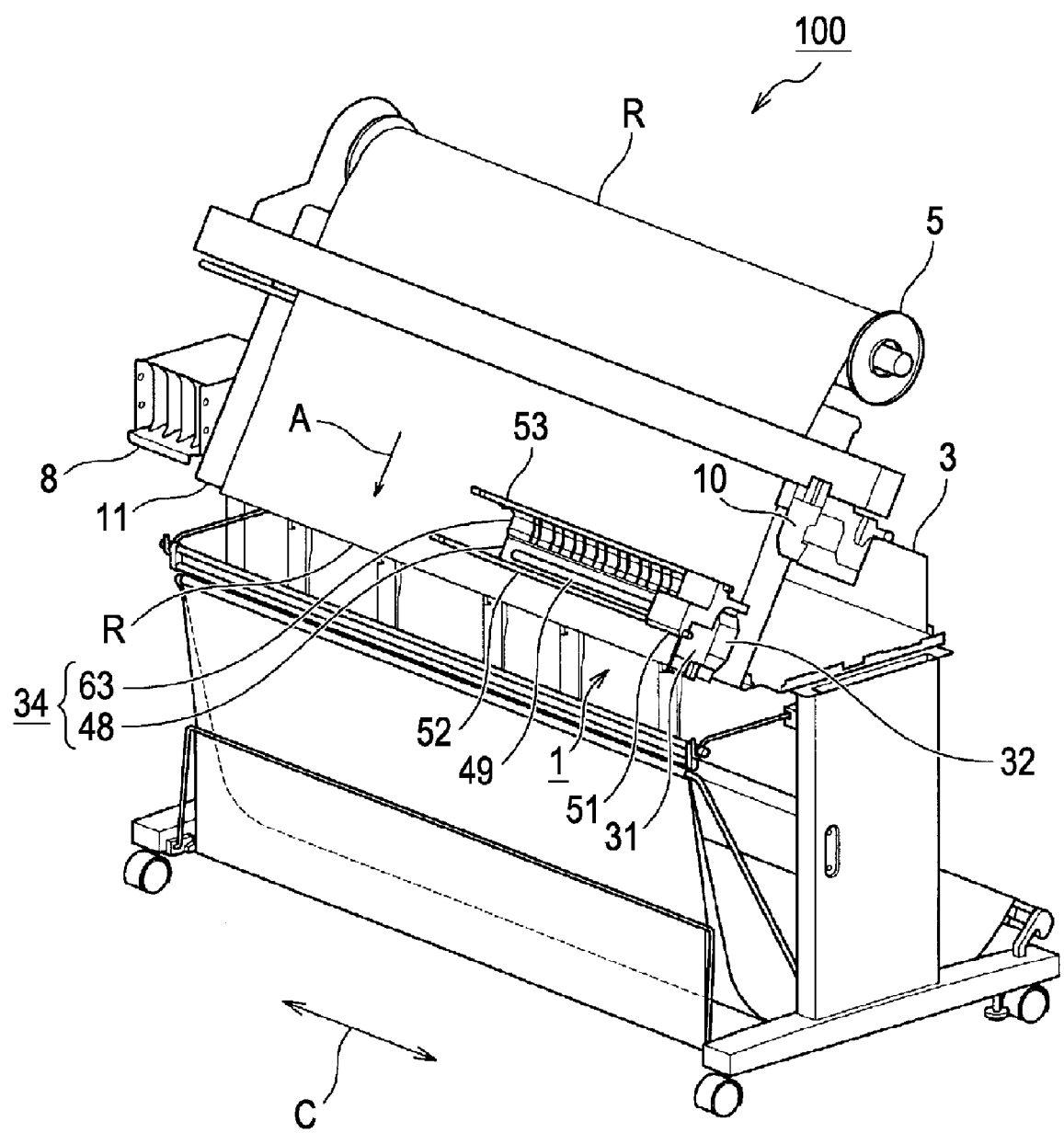
FIG. 3 is a perspective view illustrating an ink-jet printer when detaching a body cover.

FIG. 1 is a perspective view illustrating appearance of an ink-jet printer with a body cover which is attached, and FIG. 2 is a side view illustrating appearance of the ink-jet printer with the body cover which is attached. FIG. 3 is a perspective view illustrating the ink-jet printer from which the body cover is detached, and FIG. 4 is a side view illustrating the ink-jet printer from which the body cover is detached.

Figure 4:
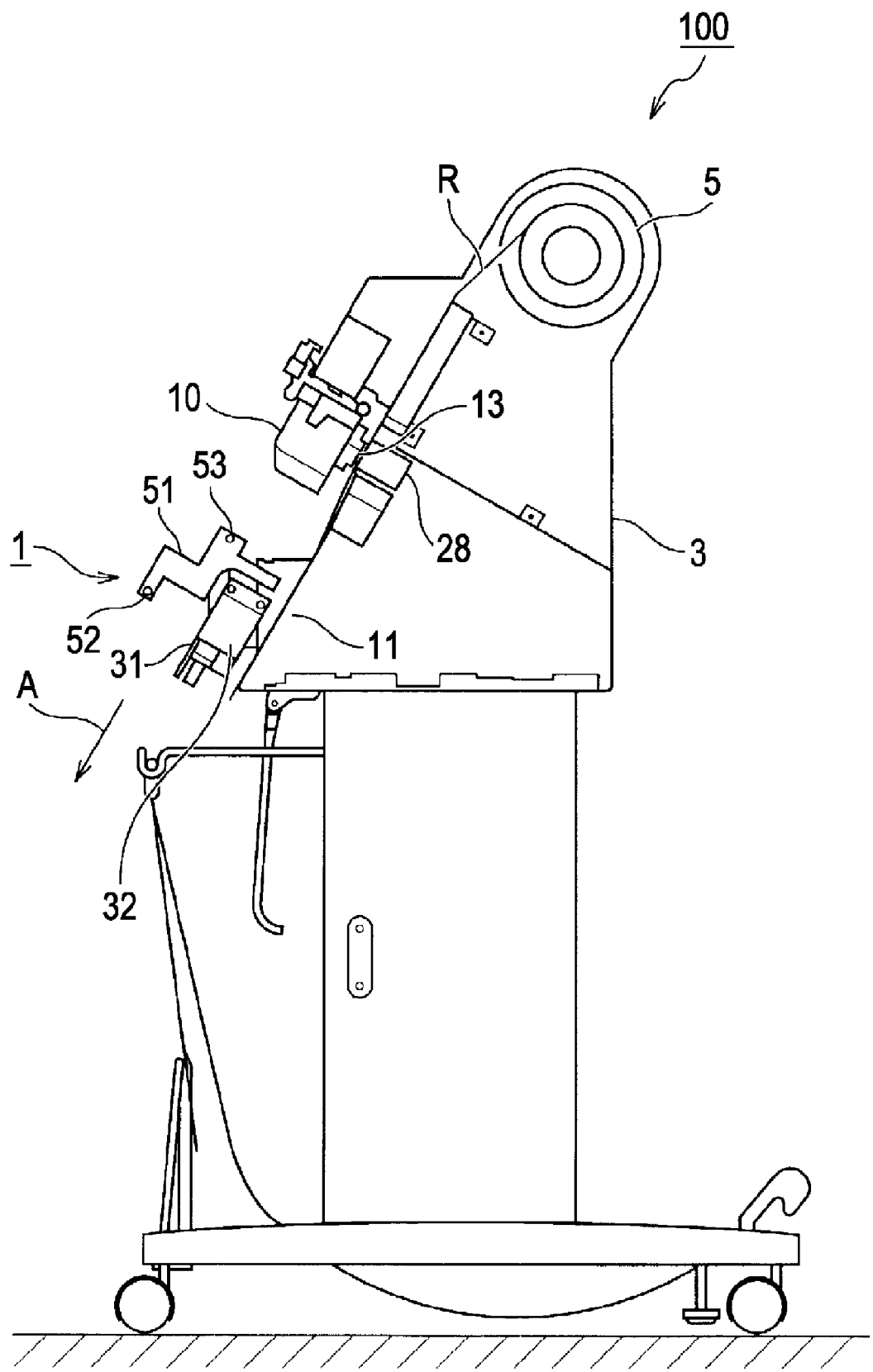
FIG. 4 is a side view illustrating an ink-jet printer when detaching a body cover.

As shown in FIGS. 3 and 4, the ink-jet printer 100 which is shown the figures includes a printer body 3 which is a kind of a recording apparatus body. As shown in FIGS. 1 and 2, the printer body 3 is covered by a body cover 2 which can hide the printer body 3. An upper rear portion of the printer body 3 is provided with a spindle which can hold the rolled paper R and a rolled paper holder 5 constituted by a pair of flange-shaped rolled paper pressing members A left end portion of the front surface of the printer body 3 is provided with a cartridge holder 8 equipped with a plurality of cartridge long holes which can receive ink cartridges of a plurality of colors, respectively.

As one example of the front surface of the ink-jet printer 100, a manipulation panel 9 which issues various kinds of manipulation instructions is supported by a bracket near the right end portion. A transportation guide plate 11 is obliquely disposed in the printer body 3 in a manner of inclining down toward a front end portion at an angle of 60° and guides the rolled paper R and the cut paper P held by the rolled paper holder 5 toward a front lower portion thereof in a transportation direction A. A paper transporting roller which is not shown and constituted by a pair of nipping rollers is disposed at an upstream position of a transportation path of the rolled paper R and the cut paper P. Moreover, a recording head 13, which is held by a carriage 10 in a manner of reciprocally movable manner in a width direction of the printer body 3, and a platen 28 disposed under the recording head 13 with a distance therebetween are disposed at a downstream position of the transporting roller.

A color measuring unit 1 according to the invention, which will be described below, is disposed at a downstream position of the transportation path of the rolled paper R and the cut paper P and a surrounding side area of the home position. As shown in FIGS. 1 and 2, a unit cover 30 having a hood shape is attached to the color measuring unit 1.

Embodiment 1

Next, the color measuring unit 1 of the invention, which is mounted in the ink-jet printer 100 having the structure described above, will be described in detail with reference to the accompanying drawings.

Figure 5:
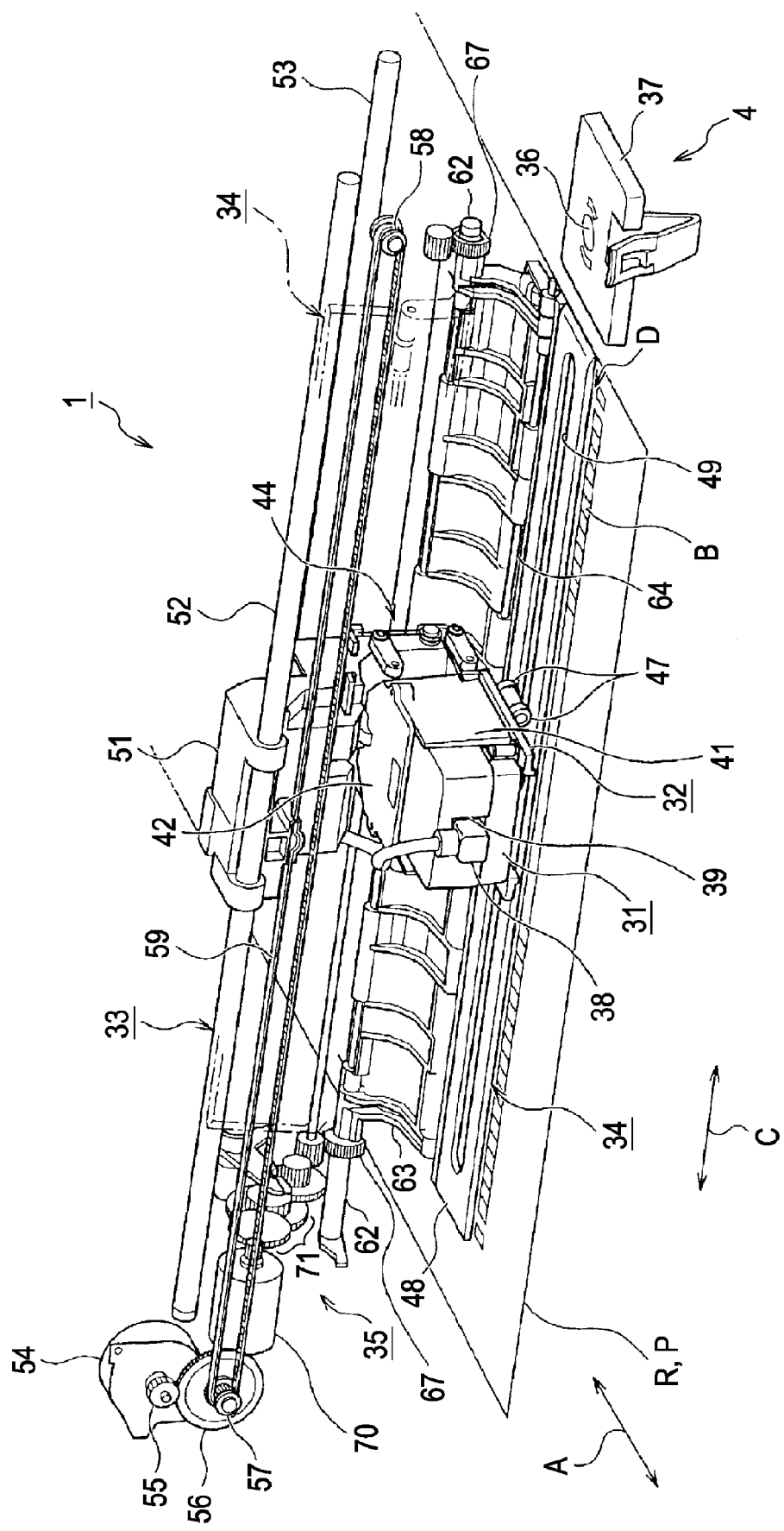
FIG. 5 is a perspective view illustrating an internal structure of a unit of measuring color from which a unit cover is detached.
Figure 6:
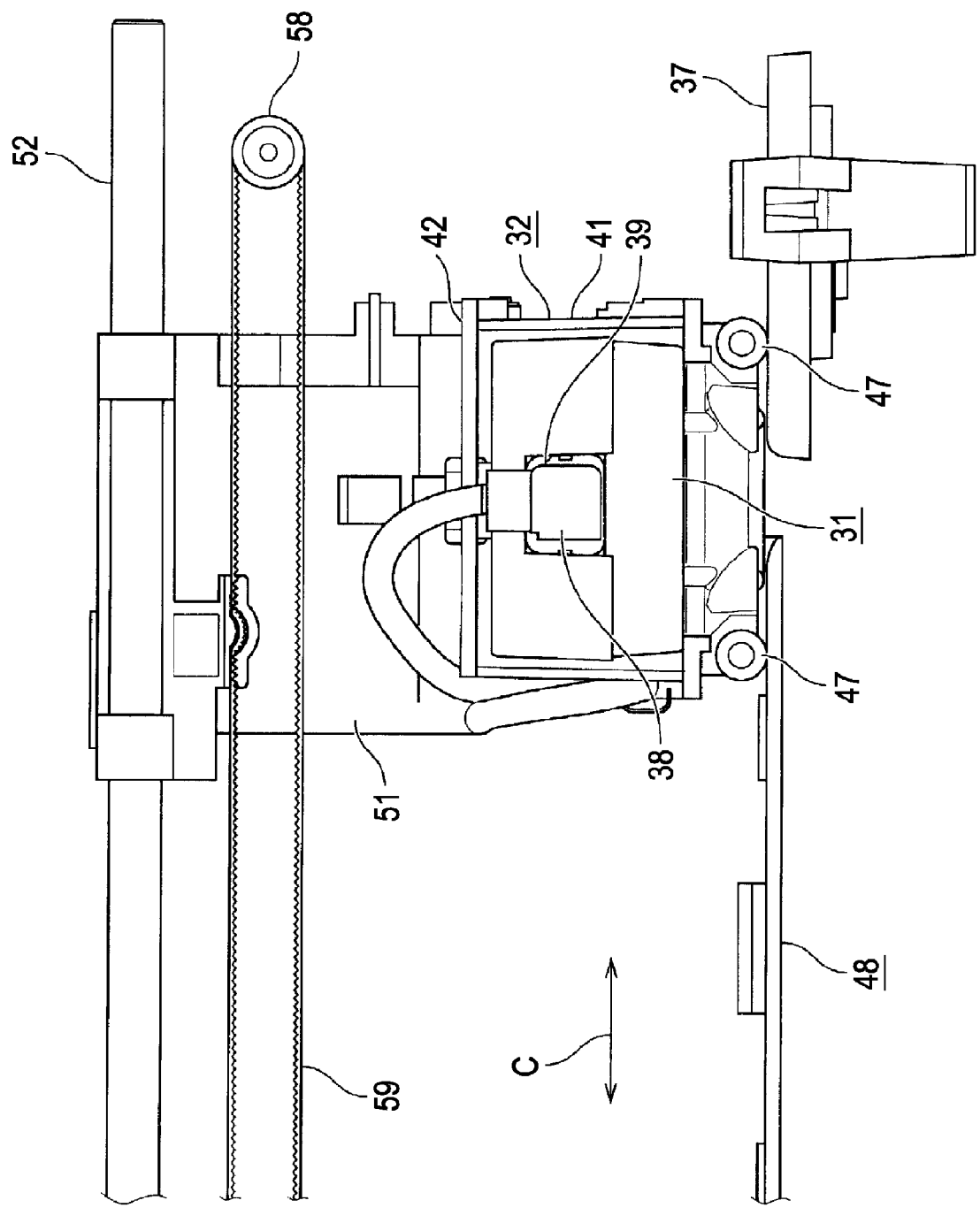
FIG. 6 is a front view illustrating a calorimeter and the surrounding area of the calorimeter in an enlarging manner.
Figure 7:
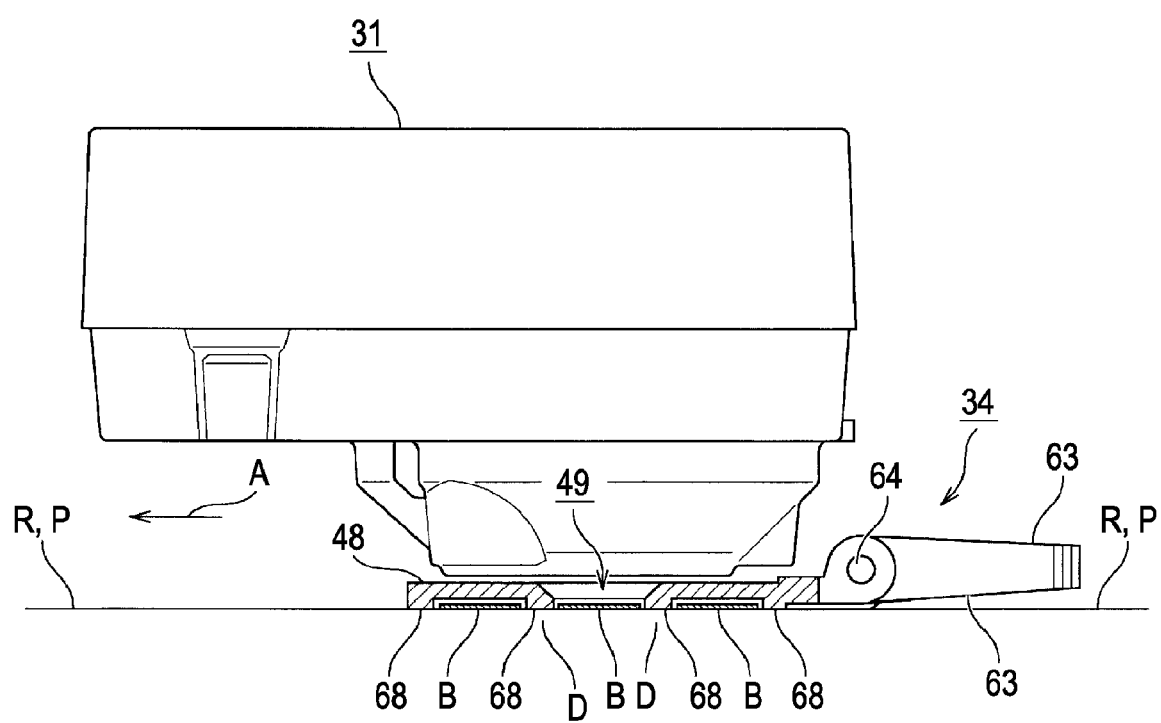
FIG. 7 is a side cross-sectional view illustrating the relationship among a colorimeter, a pressing member, and a color patch.
Figure 8:
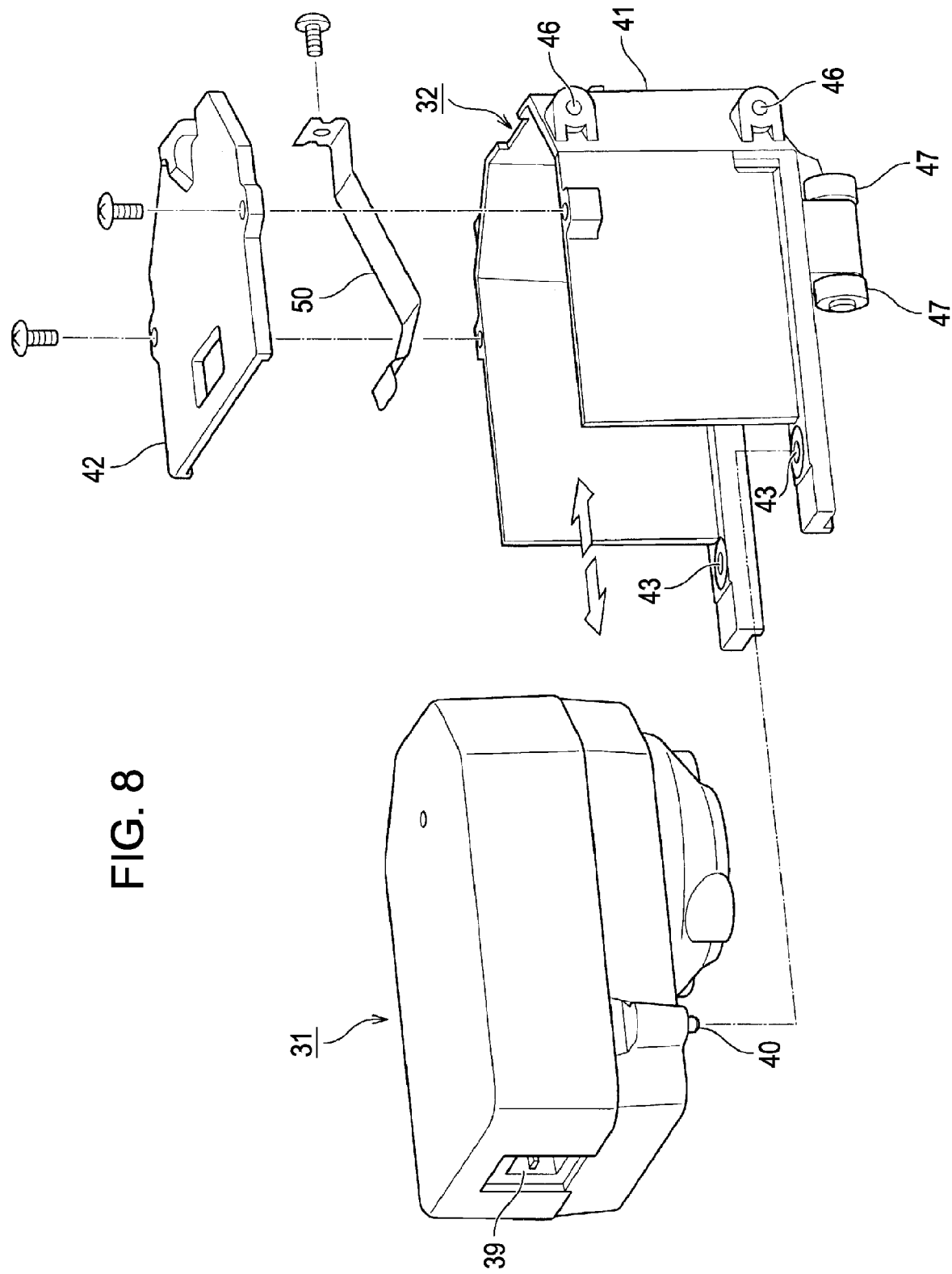
FIG. 8 is an exploded perspective view illustrating a calorimeter and a calorimeter holder.
Figure 9:
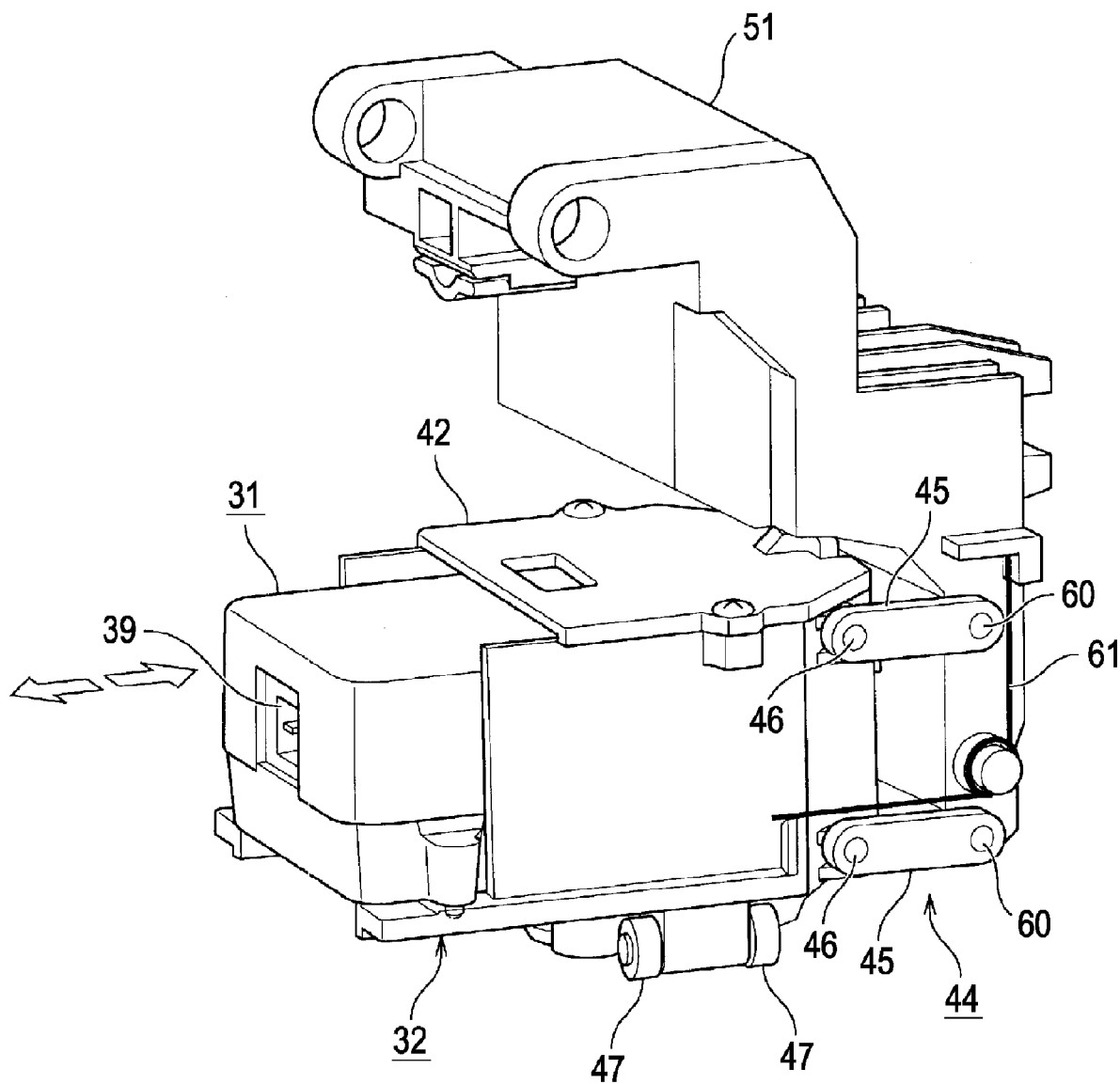
FIG. 9 is a perspective view illustrating a contact state of the calorimeter and a calorimeter carriage.
Figure 10:
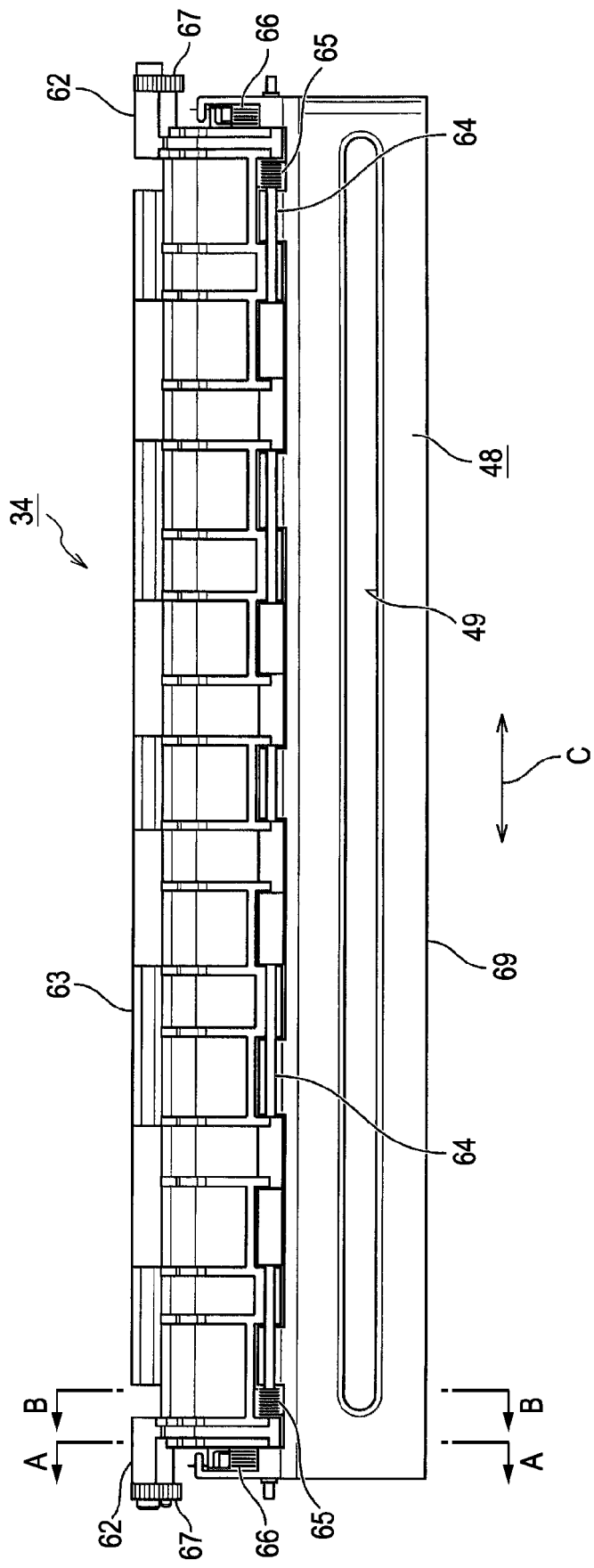
FIG. 10 is a plan view illustrating the pressing member.
Figure 11:
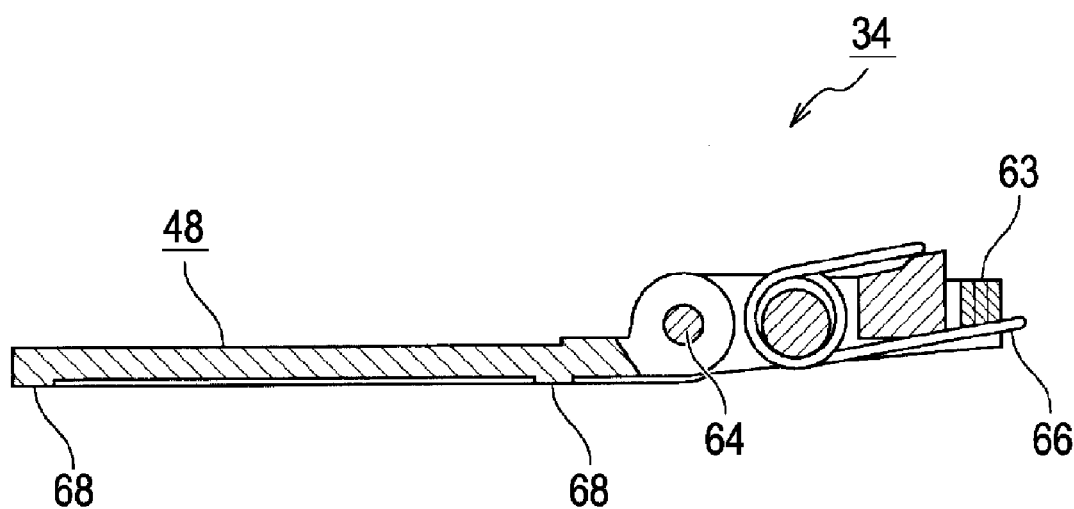
FIG. 11 is a sectional view taken along line A-A of FIG. 10.
Figure 12:
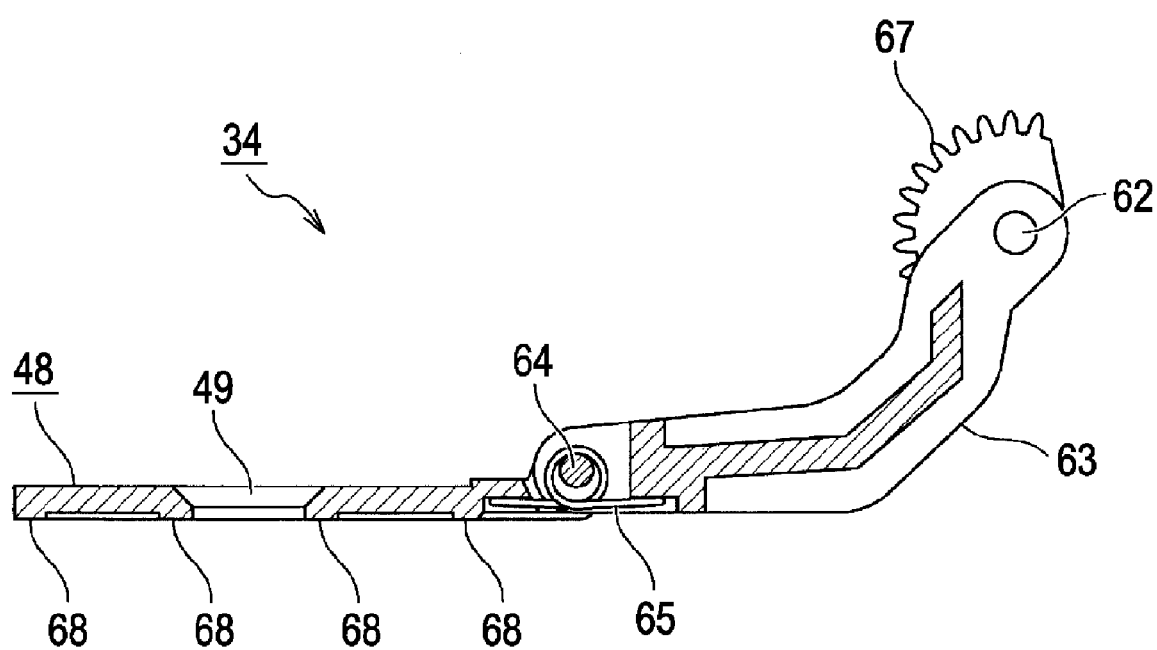
FIG. 12 is a sectional view taken along line B-B of FIG. 10.
Figure 13:
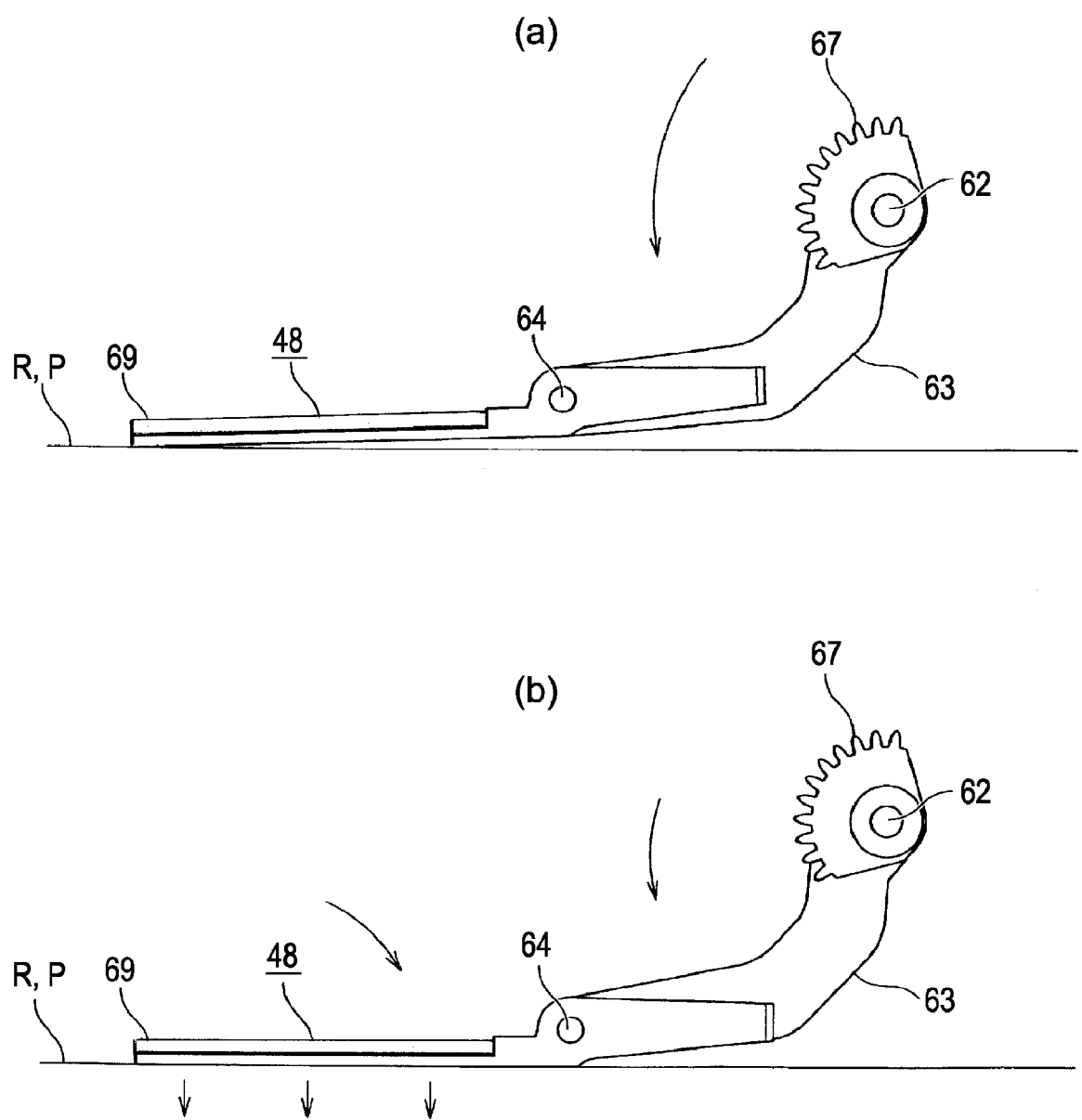
FIG. 13 is a side sectional view illustrating an operating state of the pressing member.
Figure 14:
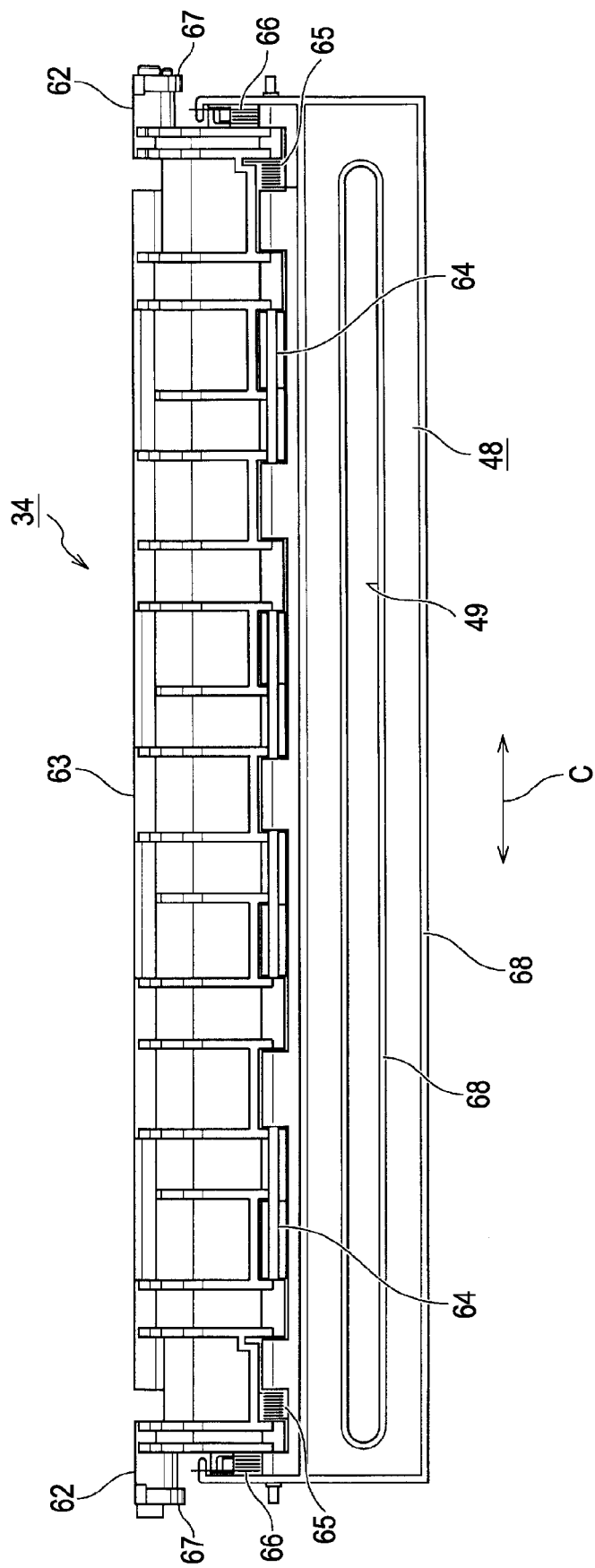
FIG. 14 is a bottom view illustrating the pressing member.

FIG. 5 is a perspective view illustrating the internal structure of main part of the color measuring unit. FIG. 6 is a front view illustrating a calorimeter of the color measuring unit, which is disposed near the home position, and a surrounding area of the calorimeter in an enlarging manner. FIG. 7 is a side sectional view illustrating the positional relationship among the colorimeter, the pressing member, and the profile production color patch. FIG. 8 is an exploded perspective view illustrating the calorimeter and the calorimeter holder. FIG. 9 is a perspective view illustrating the color-meter, the calorimeter holder, a calorimeter carriage, and compliance mechanisms disposed between the calorimeter holder and the calorimeter carriage. FIG. 10 is a plan view illustrating the pressing member and FIG. 11 is a sectional view taken along line A-A of FIG. 10. FIG. 12 is a sectional view taken along line B-B of FIG. 10. FIG. 13 is a side sectional view illustrating the time (a) when the pressing member abuts on the surface of the recording member and the state (b) in which the pressing member is in close contact with the surface of the recording member at the time of measuring color. FIG. 14 is a bottom view illustrating the pressing member.

The color measuring unit 1 according to this embodiment is basically structured to include a calorimeter holder 32 which holds a calorimeter 31, a carriage reciprocating means 33, a pressing member 34, a rotating and shifting means 35, a white tile 36 constituting with a calibration means 4, and a tile holder 37 which are integrally formed in a single unit.

The calorimeter 31 is a measuring apparatus which irradiates a color measuring pattern B (hereinafter, referred to as color patch B) recorded on the rolled paper R or the cut paper P, and obtains a correction value by measuring color information used for color correction on the basis of the light which is reflected from the color patch B and returns. As shown in FIG. 8, it has appearance having a box shape with corners. In addition, with this embodiment, the calorimeter 31 is provided with a socket 39 to be connected to a connector wiring 38 and with two engaging pins 40 so that it can be engaged with the calorimeter holder 32 which will be described below.

In addition, an example of the color information is color information based on Lab color mode in which color values are defined by white balance, chromaticity, and brightness. Since a monitor uses the RGB color mode and the ink-jet printer 100 uses the CMYK color mode, the color information is converted into the RGB mode or the CMYK color mode on the basis of the Lab color mode measured by the calorimeter 31, correction values of the monitor side and the ink-jet printer 100 side can be calculated and then used.

The calorimeter holder 32 is a holding member for holding the calorimeter 31 and is equipped with a holder case 41 whose front side, top side, and bottom side are open, and a case cover 42 which covers the top side of the holder case 41. The holder case 41 is provided with two engaging holes 43 to engage with two engaging pins 40 of the calorimeter 31 and four rotating positions 46 connected with ends of four links 45 of the compliance mechanism 44 in a freely rotatable manner. Four driving cartwheels 47 constituted by bearings are installed on the bottom surface of the calorimeter holder 32 in a freely pivotable manner.

Further, the driving cartwheels 47 contacts a portion of the surface (the upper surface) of the pressing plate 48 while rolling over so as to cross a long hole-shaped long hole 49 formed to extend in a column direction C (width direction of the recording member) of the color measuring pattern, which is a longitudinal direction of the pressing plate 48 of the pressing member 34. On the other hand, the back surface of the case cover 42 is provided with a pressing spring 50 constituted by a leaf spring having a curve shape. Further, as indicated by an arrow of FIG. 8, the calorimeter 31 can be attached to the calorimeter holder 32 which is disposed at near side thereof in one-touch and detached from the calorimeter 32 thanks to the force acting in a downward direction attributable to the pressing spring 50 and engagement between the engaging pins 40 and the engaging holes 43.

The carriage reciprocating means 33 is a means for reciprocally moving the calorimeter 31 held by the calorimeter holder 32 in a column direction C of the color measuring pattern. In greater detail, the carriage reciprocating means 33 comes in contact with the calorimeter holder 32 via the compliance mechanism 44 and the carriage reciprocating means 33 consists of a calorimeter carnage 51 reciprocally moving along the calorimeter 31, two guides shafts consisting of a main shaft 52 and a sub shaft 53 which guide the calorimeter carriage 51, a carriage driving motor 54 arranged at a return position which is a driving origin when reciprocally moving the calorimeter carriage 51, a pinion gear 55 attached to an output shaft of the carriage driving motor 54, a transferring gear 56 engaging with the pinion gear 55, a driving pulley 57 integrally formed with the transferring gear 56, a driven pulley 58 installed at a home position, and a timing belt 59 having an endless band shape and wound around the driving pulley 57 and the driven pulley 58 and engaging with the calorimeter carriage 51.

The compliance mechanism 44 is a mechanism for making the driving cartwheel 47 installed on the bottom surface of the calorimeter holder 32 run while always being in contact with the pressing plate 48 which will be described below. The compliance mechanism 44 has a function of smoothing movement of the carriage calibration means 4 between the tile holder 37 and the pressing plate 48. In greater detail, the compliance mechanism 44 consists of a horizontal link mechanism constituted by four links 45 which link a rotating position 46 of the calorimeter 32 with a rotating position 60 of the calorimeter carriage 51 and a torsional coil spring 61 used to applying a pressure and disposed between the calorimeter holder 32 and the calorimeter carriage 51.

The pressing member 34 is a member taking a pressing posture (position of a solid line of FIG. 5) in it pressing the surface of the rolled paper R or the cut paper P on which the color patch B is recording when coloring measure, and taking a retreated posture (position of an imaginary line of FIG. 5) in which it contracts in a vertically upward direction to allow the rolled paper R or the cut paper P to be transported when not measuring color. In greater detail, the pressing member 34 is structured to include a rotating lever 63 rotating about a rotating shaft 62, which is integrally formed therewith, as a rotation center in a range of 90°, a pressing plate 48 connected to a free end of the rotating lever 63 via the rotating pin 64 in a freely rotational manner, a pressing plate support spring 65 disposed between the rotating lever 63 and the pressing plate 48, and a pressing plate pushing spring 66.

The rotating lever 63 is a plate-shaped lever which is bent and is long in the column direction C of the color measuring pattern. Further, the rotating lever 63 is integrally formed with the rotating shaft 62 such that it protrudes from the left and right side end of an anchor portion. In addition, the rotating shaft 62 is provided with fan-shaped gears 67 having teeth in a range of 90°. The pressing plate 48 is a flat plate shaped member which is long in the column direction C of the color measuring pattern and the long holes 49 extending in the column direction C of the color measuring pattern are formed at the center of the upper surface of the pressing plate 48 to penetrate the pressing plate 48 to the bottom surface (lower surface) of the pressing plate 48.

As shown in FIGS. 7 and 14, the bottom surface of the pressing plate 48 is provided with pressing protrusions 68 which protrude downward from the bottom surface at the surrounding areas of the long hole 49 and the pressing plate 48 in the rib form. Accordingly, thanks to the presence of the pressing protrusions 68 at such locations, a plurality of color patches B, which are arranged in the column direction C of the color measuring pattern, can press the surface of the rolled paper R or the cut paper P while not being in contact with columns of a profile production color patch B which are arranged in multiple stages with isolating portions D which are empty spaces therebetween in the transportation direction A.

As shown in FIG. 12, the pressing plate support spring 65 is constituted as a torsional coil spring which applies the pressing plate 48 and applies the force to the pressing plate 48 such that a leading end 69 of the pressing plate 48 is lowered down. On the other hand, as shown in FIG. 11, the pressing plate pushing spring 66 is constituted as a torsional coil spring which supports and applies the force to the pressing plate 48 such that the leading end 69 of the pressing plate cannot be raised The energizing force of both of the pressing plate support spring 65 and the pressing plate pushing spring 66 is set such that the energizing force of the pressing plate pushing spring 66 is stronger than that of the pressing plate support spring 65.

Accordingly, by the actions of the pressing plate support spring 65 and the pressing plate pushing spring 66, the energizing forces direct in reverse directions when the leading end 69 of the pressing plate 48 is not in contact with the surface of the rolled paper R or the cut paper P, i.e. in a no-load state. As a result, the pressing plate 48 is maintained in a parallel state with the rotating lever 63.

In this embodiment, the pressing plate support spring 65 is used. However, since the pressing plate 48 has the own weight, the mechanism can be stably operated only with the pressing plate pushing spring 66 without the use of the pressing plate support spring 65.

That is, it is possible to obtain the same effect by the use of only pressing plate pushing spring 66. On the other hand, as shown in FIG. 13(a), when the leading end 69 of the pressing plate 48 comes to contact with the surface of the rolled paper R or the cut paper P, the force is applied in a direction of expanding the pressing plate pushing spring 66 (FIG. 11). In this manner, the pressing plate 48 of FIG. 13 is rotated in a clockwise direct on by elastically deforming the pressing plate pushing spring 66 in an expanding direction. As a result, as shown in FIG. 13(b), the entire surface of the lower surface of the pressing plate 48 is brought into securely tight contact with the surface of the rolled paper R and the cut paper P. At this time, since reaction force generated when the pressing plate pushing spring 66 would return to its original form is applied to the pressing plate 48, the surface of the rolled paper R or the cut paper P is securely held by the strong pressing force.

The rotating and shifting means 35 is a means for switching the pressing member 34 between the pressing posture and the retreated posture. In greater detail, the rotating and shifting means 35 consists of a pressing member driving motor 70 which is a driving power source and a gear wheel column 71 for transferring the rotation motion of the pressing member driving motor 70 to the fan-shaped gear 67.

The calibration means 4 is constituted as a tile holder 37 holding the white tile 36. The white tile 36 is a tile made of ceramics for performing calibration of the calorimeter 31 when not measuring color. The white tile 36 is held by the tile holder 37 in a detachable state.

The tile holder 37 holding the white tile 36 is disposed at a home position of the carriage reciprocating means 33 on the transportation path of the rolled paper R or the cut paper P on which the color patch B is recorded. Further, at an un-measuring time that the calorimeter carriage 51 is located at the home position, the calorimeter 31 is in the state of covering the upper surface of the white tile 36 so that the dirt is prevented from sticking to the surface of the white tile 36.

Next, described will be operations of the color measuring unit according to the invention having the above mentioned structure (1) when measuring color, and (2) when not measuring color, respectively.

(1) Operation when Measuring Color

When measuring color, the calorimeter 31 is inserted from the front side so that it is set in the calorimeter holder 32. For this instance, the calorimeter 31 inserted in the calorimeter holder 32 is held by the calorimeter 32 thanks to the engagement operation between the engaging pins 40 and the engaging holes 43 and the energizing force of the pressing spring 50 exerting in a downward direction. Next, a connector wiring 38 is connected to the socket 39 of the calorimeter 31. Next, the rolled paper R or the cut paper P on which the color patch B is recorded is transported to a downstream side from an upstream side of the transportation direction A and stops at a predetermined position for measuring color.

In this state, when a predetermined driving switch is manipulated so that the color measuring unit 1 is driven, the pressing member driving motor 70 rotates in a forward direction so that the pressing member 34 falls into the pressing posture indicated by the solid line of FIG. 5. Moreover, in this state, the pressing plate 48 abuts on and presses the surface of the rolled paper R or the cut paper P on which the color patch B is recorded by the operation of the pressing plate support spring 65 and the pressing plate pushing spring 66. The color measuring color patch B is disposed under the long hole 49.

In this state, first of all, color of the white tile 36 is measured by the calorimeter 31 and calibration is performed. That is, zero correction is performed before measuring color of the color patch B.

FIG. 15 is a front sectional view illustrating the surrounding area of the tile holder when not measuring color (when performing calibration) in an enlarging manner. FIG. 16 is a front sectional view illustrating the surrounding area of the pressing plate when measuring color.

As shown in FIG. 15, the white tile 36 is attached to the underside of the tile holder 37, and the white tile 36 is fixed to a tile storage portion 81 via a spring 82. In greater detail, a portion of the upper surface of the white tile 36 is pressed against the back side of the tile holder 37 by the energizing force of the spring 82. Further, the white tile 36 may be structured such that a ceramic plate is provided on the upper surface of a resin body.

Accordingly, the distance L1 between the upper surface of the white tile 36 and the surface of the tile holder 37 is determined with high accuracy.

Thus, the calorimeter 31 can perform the zero correction, i.e. calibration, by measuring color of the white tile 36 via a hole portion 80 formed in the tile holder 37.

As shown in FIGS. 15 and 16, the tile holder 37 is set such that the distance L1 between the upper surface of the white tile 36 and the upper surface of the tile holder 37 is equal to the distance L2 between the surface of the rolled paper R or the cut paper P on which the color patch B is recorded and the upper surface of the pressing plate 48. In other words, the thickness L1 of the tile holder 37, which is the way from the upper surface of the white tile 36 to the a position at which the tile holder 37 contacts the driving wheels 47, 47, . . . , and 47 of the calorimeter holder 32 is set to be equal to the thickness of the pressing plate 48 (L2), which is the way from the color patch B on the surface of the rolled paper R or the cut paper P to a position at which the pressing plate 48 contacts the driving wheels 47, 47, . . . , and 47 of the colorimeter holder 32.

Next, the carriage driving motor 54 starts to rotate to drive the timing belt 59 so that the calorimeter carriage 51 is transported from the home position to the color measuring position and the driving wheel 47 is brought into contact with the upper surface of the pressing plate 48 in the pressing posture. The timing belt 59 continues to drive in the above-mentioned state, the calorimeter 31 and the calorimeter carriage 51 held by the calorimeter 32 starts to move toward the return position in turns from the color patch B located near the home position. Thus, with this embodiment, color information measured by the calorimeter 31 is sent to a processing apparatus which is not shown and compared with color information of an image displayed on a monitor to calculate a correction value. The correction value is supplied to a printer driver of the ink-jet printer 100 and is used in subsequent recording.

As described above, the distance L1 from the upper surface of the white tile 36 to the tile holder 37 is set to be equal to the distance L2 from the color patch B recorded on the rolled paper R or the cut paper P to the upper surface of the pressing plate 48.

Accordingly, it is possible to harmonize the fluctuation at the time of measuring color with the fluctuation at the time of performing calibration. As a result, it is possible to minimize the error of the value of color measurement.

In greater detail, since the distance L1 from the upper surface of the white tile 36 to the upper surface of the tile holder 37 is equal to the distance L2 from the color patch B recorded on the rolled paper R or the cut paper P to the pressing plate 48, when one of the distances, for example the distance L1 (or L2), fluctuates, it is possible to cause fluctuation of the other distance L2 (or L1) and thus it is possible to minimize the error of the values of color measurement.

For example, when the distance L1 is increased as the tile holder 37 slightly expands and deforms due to heat, et al., the distance L2 is also increased as the pressing plate 48 deforms in the similar manner.

That is, the error of the values obtained by the calorimeter 31 when measuring color of the color path B can be offset by the error of the values obtained by the calorimeter 31 when performing calibration by lengthening the distances L1 and L2 in the same manner. As a result, it is possible to minimize the error considered when performing recording on the basis of the values obtained by performing color measurement with respect to the color patch B.

(2) Operation when not Measuring Color

When the calorimeter 31 measures color information of the entire color patch B, the carriage driving motor 54 comes to rotate in a backward direction, and the colorimeter 31 disposed at the return position starts to move toward the home position. When the calorimeter arrives at the home position, the white tile 36 falls into the state in which the upper surface thereof is covered with the calorimeter 31 and thus it is possible to dirt from sticking to the upper surface of the white tile 36. Next, the pressing member driving motor 70 comes to rotate in a backward direction, and the rotation of the pressing member driving motor is transferred to the pressing member 34 via the gear wheel column 71 and the fan-shaped gear 67. Therefore, the pressing member 34 rotates and moves in an upward direction, and falls into the retreated posture in which it is sprang upward as indicated by an imaginary line of FIG. 5. Further, in this state, since the rolled paper R or the cut paper P can be transported in the transportation direction A, an upper column of the patch B located at an upstream side of the transportation direction A is moved to the color measuring position via an empty portion D or the transportation of the rolled paper R or the cut paper P can be performed along with the recording operation performed by the ink-jet printer 100.

Other Embodiments

The color measuring unit 1 and the recording apparatus 100 equipped with the color measuring unit 1 according to the invention basically have the above-mentioned structures, but parts of the structures may be modified or omitted in a range in which it is not departed from the invention.

For example, since the color measuring unit 1 of the invention is structured in a separated form from the printer body 3, it can be mounted in the printer body 3 as an option product after manufacturing rather than it is mounted in the recording apparatus 100 from the beginning.

Moreover, the color measuring unit 1 according to the invention can be applied to a small-sized or a middle-sized ink-jet printer or laser-jet printer, or other kinds of recording apparatuses such as a copying machine as well as a large-sized ink-jet printer 100.

What is claimed is:

1. A color measuring unit, comprising:
a colorimeter holder which holds a colorimeter;
a carriage reciprocating means connected to the colorimeter holder and equipped with a colorimeter carriage which reciprocally moves the colorimeter holder in a column direction of a color measuring pattern;
a pressing member which is in a pressing posture in which the pressing member presses a surface of a recording member on which the color measuring pattern is recorded when measuring color and is in a retreated posture in which the pressing member retreats from a position of the pressing posture when not measuring color so that the recording member can be transported;
a hole, which allows light emitted from the colorimeter to reach the color measuring pattern, provided in the pressing member; and
a rotating and shifting means which switches the pressing member between the pressing posture and the retreated posture thereof.

2. The color measuring unit according to claim 1, further comprising a calibration means which performs calibration of the colorimeter when not measuring color.

3. The color measuring unit according to claim 2, wherein a tile holder holding a white tile serving as the calibration means is disposed at a home position of the colorimeter carriage, which is at a side of a transportation path along which the recording member on which the color measuring pattern is recorded passes, and the colorimeter covers an upper surface of the white tile at a time of not measuring color such as when the colorimeter carriage is located at the home position.

4. The color measuring unit according to claim 3, wherein a distance between the upper surface of the white tile and an upper surface of the tile holder and a distance between a surface of the recording member and a surface of the pressing member are equal to each other.

5. The color measuring unit according to claim 3, wherein a thickness of the tile holder from the surface of the white tile to a position where the tile holder contacts the colorimeter holder, is equal to a thickness of the pressing member from the surface of the recording member to a position where the pressing member contacts the colorimeter holder.

6. The color measuring unit according to claim 1, wherein a driving cartwheel, which is rolling in contact with the surface of the pressing member which is in the pressing posture, is disposed on the surface of the colorimeter holder which faces the color measuring pattern when measuring color.

7. The color measuring unit according to claim 1, wherein the hole is a long hole which is provided in the pressing member in a manner such that it extends in a column direction of the color measuring pattern, and a pressing surface of the pressing member is provided with pressing protrusions which contact only a portion of the surface of the recording member around the color measuring pattern.

8. The color measuring unit according to claim 7, wherein the pressing protrusions are disposed at positions where a plurality of color measuring patterns are arranged in a column direction thereof and spaced from each other so as to not contact columns of the color measuring patterns which are used for profile generation and wherein the pressing protrusions are arranged in multiple stages in a transportation direction of the recording member.

9. The color measuring unit according to claim 1, wherein the pressing member is equipped with a rotating lever which rotates about a rotating shaft, and a pressing plate which is in contact with a rotating free end of the rotating lever in a freely rotating manner and abuts on the surface of the recording member, and a pressing plate pushing spring, which is urged to support a leading end portion of the pressing plate so that the pressing plate does not move in a direction opposite to a direction in which pressure is applied, is disposed between the rotating lever and the pressing plate.

10. A recording apparatus, comprising:
a recording member transporting portion;
a record performing portion which performs recording on a recording member transported by the recording member transporting portion;
a color measuring portion which measures color of a color measuring pattern recorded in the record performing portion, wherein the color measuring portion includes a color measuring unit that comprises:
a colorimeter holder which holds a colorimeter;
a carriage reciprocating means connected to the colorimeter holder and equipped with a colorimeter carriage which reciprocally moves the colorimeter holder in a column direction of a color measuring pattern;
a pressing member which is in a pressing posture in which the pressing member presses a surface of the recording member on which the color measuring pattern is recorded when measuring color and is in a retreated posture in which the pressing member retreats from a position of the pressing posture when not measuring color so that the recording member can be transported;
a hole, which allows light emitted from the colorimeter to reach the color measuring pattern, provided in the pressing member; and
a rotating and shifting means which switches the pressing member between the pressing posture and the retreated posture thereof.

11. The recording apparatus according to claim 10, wherein the color measuring unit further comprises a calibration means which performs calibration of the colorimeter when not measuring color.

12. The recording apparatus according to claim 11, wherein a tile holder holding a white tile serving as the calibration means is disposed at a home position of the colorimeter carriage, which is at a side of a transportation path along which the recording member on which the color measuring pattern is recorded passes, and the colorimeter covers an upper surface of the white tile at a time of not measuring color such as when the colorimeter carriage is located at the home position.

13. The recording apparatus according to claim 12, wherein a distance between the upper surface of the white tile and an upper surface of the tile holder and a distance between a surface of the recording member and a surface of the pressing member are substantially equal to each other.

14. The recording apparatus according to claim 13, wherein a thickness of the tile holder from the surface of the white tile to a position where the tile holder contacts the colorimeter holder, is equal to a thickness of the pressing member from the surface of the recording member to a position where the pressing member contacts the colorimeter holder.

15. The recording apparatus according to claim 10, wherein a driving cartwheel, which is rolling in contact with the surface of the pressing member which is in the pressing posture, is disposed on the surface of the colorimeter holder which faces the color measuring pattern when measuring color.

16. The recording apparatus according to claim 10, wherein the hole is a long hole which is provided in the pressing member in a manner such that it extends in a column direction of the color measuring pattern, and a pressing surface of the pressing member is provided with pressing protrusions which contact only a portion of the surface of the recording member around the color measuring pattern.

17. The recording apparatus according to claim 16, wherein the pressing protrusions are disposed at positions where a plurality of color measuring patterns are arranged in a column direction thereof and spaced from each other so as to not contact columns of the color measuring patterns which are used for profile generation and wherein the pressing protrusions are arranged in multiple stages in a transportation direction of the recording member.

18. The recording apparatus according to claim 10, wherein the pressing member is equipped with a rotating lever which rotates about a rotating shaft, and a pressing plate which is in contact with a rotating free end of the rotating lever in a freely rotating manner and abuts on the surface of the recording member, and a pressing plate pushing spring, which is urged to support a leading end portion of the pressing plate so that the pressing plate does not move in a direction opposite to a direction in which pressure is applied, is disposed between the rotating lever and the pressing plate.

* * * * *